United States Patent [19]

Cook, Jr.

[11] 4,064,968
[45] Dec. 27, 1977

[54] SCAFFOLD FOR WORKING ON A PIPELINE MOVABLE RELATIVE TO A BASE

[75] Inventor: William B. Cook, Jr., Orange, Calif.

[73] Assignee: Santa Fe International Corporation, Orange, Calif.

[21] Appl. No.: 687,980

[22] Filed: May 20, 1976

[51] Int. Cl.² .............................................. E04G 3/16
[52] U.S. Cl. ...................................... 182/13; 182/36; 182/130; 182/129
[58] Field of Search ................. 182/129, 132, 130, 63, 182/19, 18, 13, 36, 37; 254/84, 85; 269/17

[56] References Cited

U.S. PATENT DOCUMENTS 3,446,366  5/1969  Miller .................................... 269/17
3,814,211  6/1974  Pamer .................................... 182/19

Primary Examiner—Reinaldo P. Machado
Attorney, Agent, or Firm—Michael P. Breston

[57] ABSTRACT

The invention involves working on a pipeline which is subject to movements relative to a base such as ground, the deck of a floating barge, and the like. A rollable scaffold is frictionally coupled to the pipeline so that workers carried by the scaffold can move relative to the base and, therefore, become stationary relative to the pipeline. The scaffold carries a lift means for raising and lowering a pipe support positionable under the pipeline. The scaffold therefore allows the workers to work on the pipeline without being disturbed by the relative movements between the pipeline and the base.

2 Claims, 5 Drawing Figures

SCAFFOLD FOR WORKING ON A PIPELINE MOVABLE RELATIVE TO A BASE

BACKGROUND OF THE INVENTION

Although this invention will be described for the purpose of providing a working platform for welders working on "stove-pipe" joints of a marine pipeline being assembled on the deck of a barge, the invention will find applications other than for assembling a pipeline. Such stove-pipe joints are simultaneously made on an assembly-line basis using several welding stations. After the last joint is completed, the barge is pulled forward under the pipeline. Oscillatory relative motion between the pipeline and the barge is common, chiefly due to wave-induced motions of the barge. Pipe treating equipment, such as pipe-support rollers and tensioners, normally limit the motion range of the pipeline to be mostly parallel to the deck and in an axial direction of the pipeline.

When workers attempt to perform some task on the pipeline, they must contend with and adapt themselves to the relative motion above described. Such adaptation results in the workers becoming distracted and fatigued. When such relative motions become intense, there is even good reason to fear for the safety of the workers, since they may trip over cables and other obstacles normally found on the base. Welders are particularly vulnerable, since their face masks inhibit their vision, except in the direction of the weld.

It is an object of this invention to selectively couple a rollable scaffold to a pipeline. When not coupled to the pipeline, the scaffold rests on the usual working surface. The coupling is effected by a fluid-operated system which is reliable, inexpensive, and safe. Because the amount of space, in which relative motion can take place between the pipeline and the working surface, is limited, the fluid-operated system incorporates scaffold motion limiting means. The system is automatically reactivated after the scaffold moves away from a motion-limiting means. The means attaching the scaffold to the pipeline permit the development of static frictional forces having a resultant which causes the scaffold to move compliantly with the pipeline. An advantage of such attachment means is that when the scaffold strikes some rigid object, slippage between the attachment means and the pipe can occur without causing damage to the pipe. Various attachment means can be provided. For example, multiple opposed clamps can grasp the pipe between them. The preferred attachment means is controlled by jacking between the scaffold and the pipe.

SUMMARY OF THE INVENTION

A rollable scaffold is frictionally coupled to a pipeline subject to movements relative to a base. Workers carried by the scaffold become free of the relative movements.

In one embodiment, the scaffold includes a fluid-operated system having extensible means coupled between the platform and the pipeline.

A pipe support is carried by the extensible means. Operating means are provided for selectively operating on the extensible means to thereby selectively engage the pipeline with the pipe support.

The system desirably comprises a jack coupled to a fluid-operated piston slidably mounted in a cylinder. A main valve controls fluid pressure into the cylinder, and at least one limit valve controls the main valve for limiting the movements of the scaffold.

DETAILED DESCRIPTION OF PREFERRED EMBODIMENTS

Figure 1:
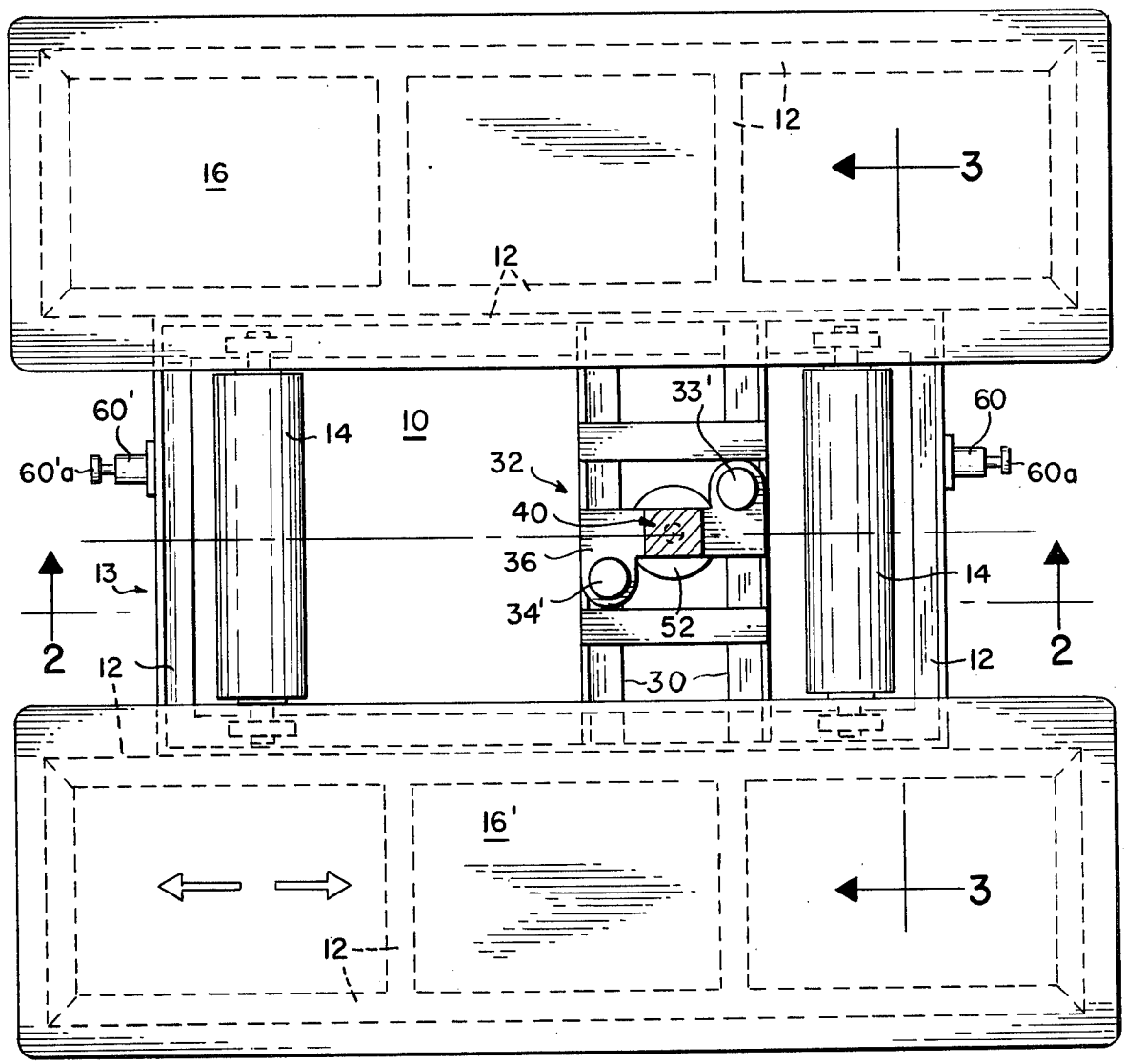
FIG. 1 is a top view of a preferred embodiment of the scaffold of this invention.
Figure 2:
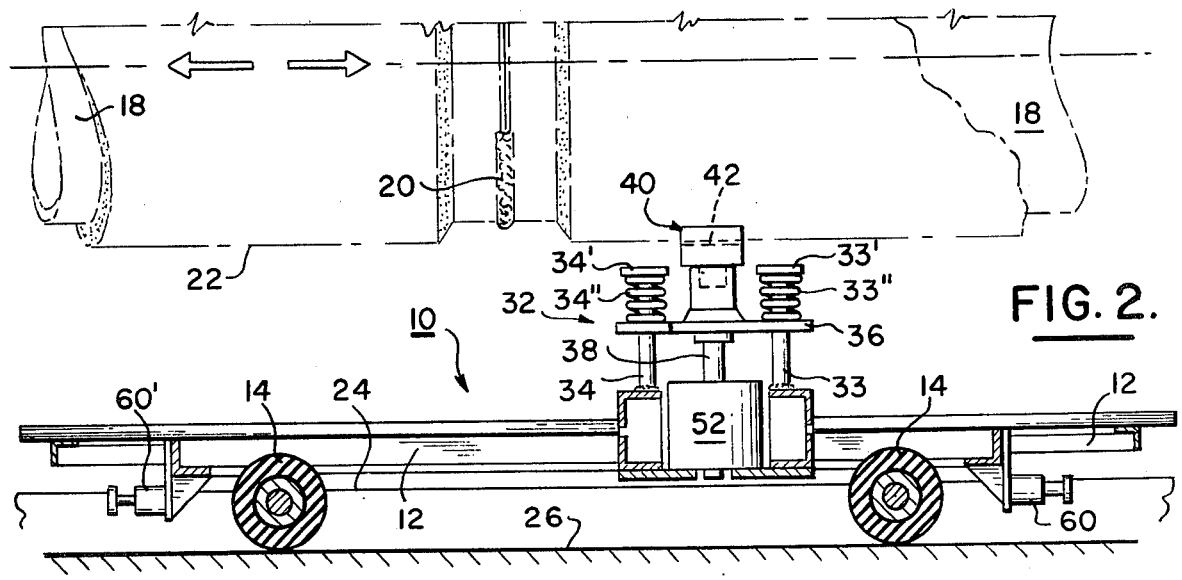
FIG. 2 is a side view, partly in section, on line 2—2 in FIG. 1.

In the drawings, the scaffold, generally designated as 10, comprises a frame 12 mounted on a suspension system 13 supported by two or more rollers 14. At least one, but preferably two working platforms 16, 16' are mounted on frame 12 symmetrically about the longitudinal center line of the scaffold. A pipeline 18 (FIG. 2) is fabricated from pipe sections by making stove-pipe welded joints 20. Each pipe section is typically coated with an external cement coating 22.

Figure 3:
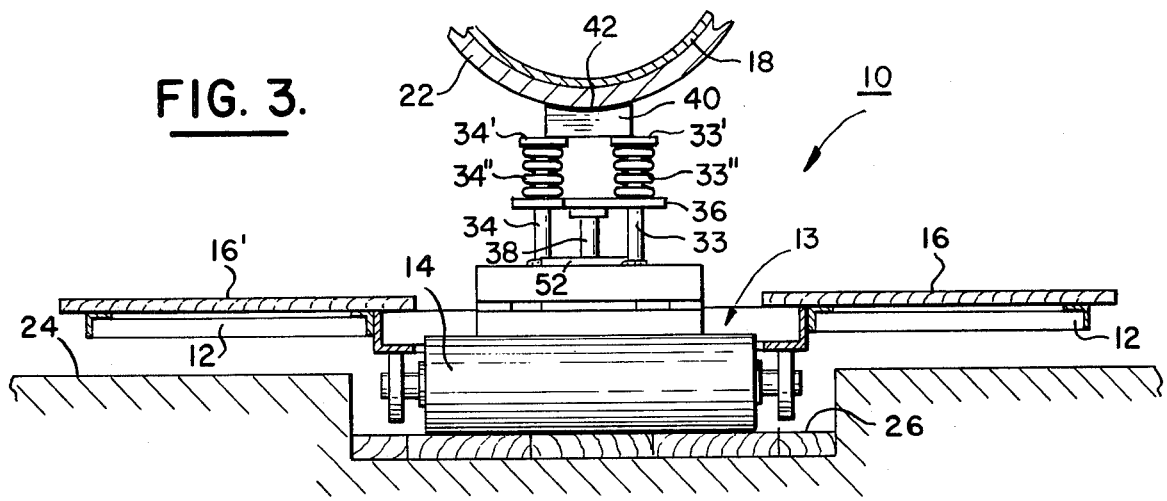
FIG. 3 is an end view on line 3—3 in FIG. 1.

In the embodiment of the scaffold illustrated in FIGS. 1-4, the rollers 14 are cylindrical and their longitudinal axes are transverse to the center line of the scaffold. The rollers 14 can roll either on the flat deck 24 of the barge or in a specially provided depressed trackway 26 (FIGS. 3). The trackway serves to limit the lateral movements of the cylindrical rollers 14, as well as to lower the platforms 16, 16' relative to the deck 24.

Mounted on a pair of transverse frame members 30 is a lifting mechanism 32 comprising a pair of vertically-extending guide members 33, 34 having enlarged head portions 33', 34', respectively. Extensible means, such as a jack 38, carries a horizontal yoke 36 which is slidably mounted on guides 33, 34. A pair of heavy-duty coil springs 33", 34" are mounted on guides 33, 34, respectively, between yoke 36 and heads 33' and 34'. Yoke 36 carries a pipe support member, such as a cushion 40 having an arcuate surface 42 adapted to engage the coating 22 on the pipeline 18. Between surface 42 and coating 22 develop static frictional forces which make the scaffold follow the relative movements of the pipeline. Cushion 40 should be made from a material that cannot damage the pipe's coating 22, in the event that relative motion does take place between them. A suitable such material is a rigid foam. Slippage of the pipe over a rigid foam cushion will not result in serious injury to the coating 22 of the pipe.

Figure 4:
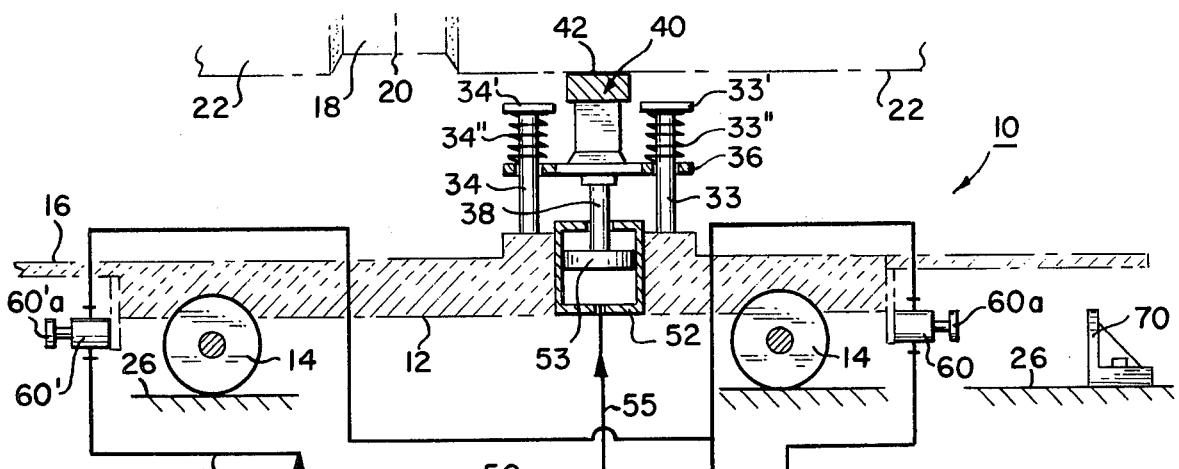
FIG. 4 is a schematic diagram of a pneumatic network used to activate the jack mounted on the scaffold.
Figure 4:
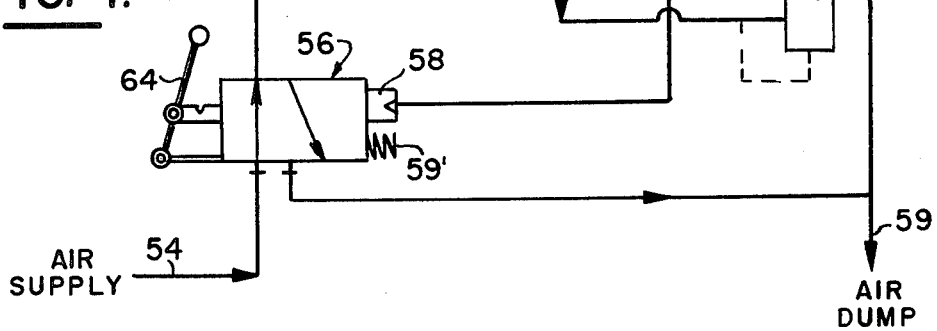

The vertical up-and-down movement of yoke 36 on which cushion 40 is mounted can be effected by a fluid-operated system, generally designated as 50 (FIG. 4). System 50 comprises a cylinder 52 in which is slidably mounted a piston 53 to which is secured a jack 38. An air pressure supply source, represented by arrow 54, feeds a high pressure line 55 through a pilot-operated, two-way valve 56. The high-pressure line 55 is coupled to a pilot line 57 through a pair of normally-closed, limit valves 60, 60', having movable plungers 60a, 60'a, respectively. The plungers are coupled to spools (not shown) inside their limit valves. When a plunger moves its spool inwardly, its limit valve will open, thereby allowing pressure line 55 to communicate with the pilot line 57. The limit valves 60, 60' can be secured to the main frame 12 on the opposite sides of the longitudinal center line of the scaffold. While only two such limit valves are shown, any desired number can be provided, and the same would be connected in a similar manner between the high-pressure line 55 and the pilot line 57. The high-pressure line 55 can be coupled to an air dump, represented by arrow 59, through an adjustable relief valve 62.

The sliding spool inside the actuating valve 56 is shifted by a manually-operated lever 64. Valve 56 is shown in FIG. 4 to be in its ON position, so that line 55 becomes pressurized by the air supply source 54. When lever 64 is rotated counterclockwise, as viewed in FIG. 4, the spool in valve 56 will shift to the left, causing valve 56 to assume its DUMP position, so that valve 56 connects air supply source 54 with the air dump 59.

When a limit valve 60 causes pilot line 57 to become pressurized, pilot 58 will overcome the bias produced by a spring 59', and valve 56 will shift from its ON position to its DUMP position. Conversely, the removal of the pressure from pilot line 57 will cause spring 59' to return valve 56 from its DUMP position to its ON position.

In operation, valve 56 is normally in its DUMP position, allowing the compression springs 33", 34" to exert a downward force on yoke 36. The cushion 40 will therefore be decoupled from the pipeline 18, and the scaffold will not follow the relative movements between the pipeline and the deck 24.

When the spool valve 56 is moved by lever 64 to its ON position, as shown in FIG. 4, line 55 will pressurize cylinder 52, causing yoke 36 to move upwardly against the resistance of coil springs 33", 34", whereupon cushion 40 will engage the pipeline. The lateral frictional forces developed between the pipe and the cushion will cause the scaffold to compliantly follow, within limits, the relative movements of the pipeline.

These limits are established by fixed objects on deck 24 or by one or more special limit stops 70 (FIG. 4) provided for the purpose of limiting the movements of the scaffold. When a plunger 60a or 60'a abuts against a stop 70, its normally-closed limit valve 60 or 60' will open, thereby establishing fluid communication between pressure line 55 and pilot line 57. The high pressure on line 57 will operate the pilot 58 which results in cylinder 52 becoming depressurized. Coil springs 33", 34" ensure a positive disengagement between cushion 40 and pipeline 18. Jack 38, yoke 36, and cushion 40 will all move downwardly, thereby automatically disengaging the scaffold from the pipeline.

When the scaffold, either by itself, or through operator intervention, moves away from stop 70, then limit valve 60 will automatically return to its normally-closed position, thereby breaking communication between the pilot line 57 and the high-pressure line 55, whereupon cylinder 52 will again pressurize, causing the re-engagement between cushion 40 and pipeline 18.

Jack 38 will also automatically compensate, within limits, for variations in the level of deck 24 or the passageway 26, since the cushion 40 will move up or down with the up and down movements of rollers 14.

It will therefore be appreciated that the working platforms 16, 16' will follow the movements of the pipeline relative to the deck, and workers such as welders and their tools standing thereon will be maintained stationary relative to the pipeline without effort on their part, thereby greatly enhancing the productivity and safety of the working personnel.

Figure 5:
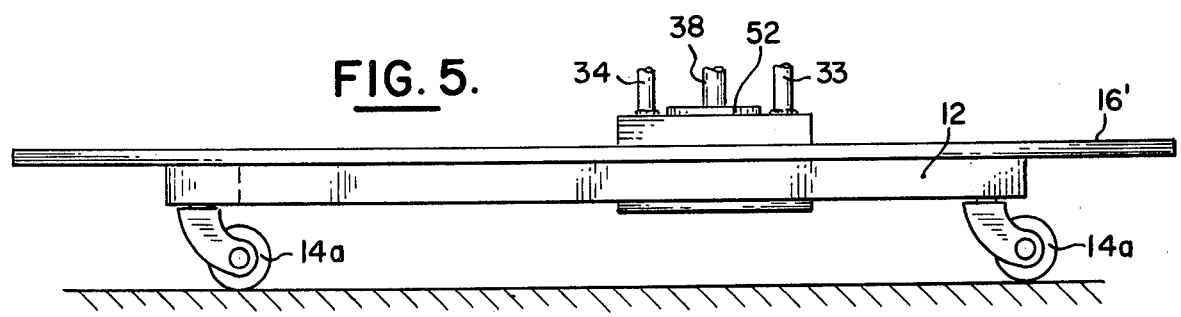
FIG. 5 illustrates the scaffold with caster-type rollers.

For most applications the cylindrical rollers 14 will be adequate to follow the longitudinal movements of the pipeline and even some lateral movements as well, since the rollers can slide over the deck or in the limited passageway 26. However, should it be desired for the scaffold to follow the pipeline equally well in all directions, instead of cylindrical rollers 14, the suspension 13 can be mounted on caster-type rollers 14a, as shown in FIG. 5. It is desirable that rollers 14 or 14a be constructed of an electrically-insulating material to protect the workers on platforms 16, 16' from electric shock.

What is claimed is:

1. A scaffold adapted to follow the movements of a coated pipeline relative to a base having a depressed trackway, comprising:
   a platform supported on a pair of spaced cylindrical rollers having their longitudinal axes transverse to the center line of the scaffold, said trackway limiting the lateral movements of said rollers;
   a fluid-operated system including extensible means movable between said platform and said pipeline;
   a flexible pipe support member carried by said extensible means for frictionally engaging said pipeline, said member having an arcuate surface adapted to engage the coating of the pipeline and being adapted to allow relative movements between said member and said pipeline; and
   said system including operating means for selectively moving said extensible means with said pipe support member into and out of frictional engagement with said pipeline.

2. The scaffold of claim 1, wherein said system comprises:
   a jack coupled to a fluid-operated piston slidably mounted in a cylinder,
   a main valve for controlling fluid pressure into said cylinder, and
   at least one scaffold position limit valve for controlling said main valve, thereby limiting the movements of said scaffold.

* * * * *